United States Patent [19]
Howard

[11] Patent Number: 5,430,543
[45] Date of Patent: Jul. 4, 1995

[54] RING LASER GYRO DETECTOR LENS SYSTEM

[75] Inventor: Timothy L. Howard, Placentia, Calif.

[73] Assignee: Rockwell International Corporation, Seal Beach, Calif.

[21] Appl. No.: 686,336

[22] Filed: Dec. 26, 1984

[51] Int. Cl.[6] .......................... G01B 9/02; H01S 3/083
[52] U.S. Cl. ..................................... 356/350; 372/94; 372/108
[58] Field of Search ................. 356/350, 28.5, 349; 372/94, 108; 350/163

[56] References Cited

U.S. PATENT DOCUMENTS

| | | | |
|---|---|---|---|
| 3,373,650 | 3/1968 | Killpatrick | 356/350 |
| 4,149,773 | 4/1979 | Reid | 350/163 |
| 4,309,104 | 1/1982 | Prinz et al. | 356/28 |
| 4,320,974 | 3/1982 | Ljung | 356/350 |
| 4,342,517 | 8/1982 | Johnson et al. | 356/350 |
| 4,344,706 | 8/1982 | Ljung et al. | 356/350 |
| 4,566,794 | 1/1986 | Hanse | 356/350 |

*Primary Examiner*—Stephen C. Buczinski
*Attorney, Agent, or Firm*—H. Fredrick Hamann; George A. Montanye; Tom Streeter

[57] ABSTRACT

A ring laser gyroscope detector lens system for mounting on a ring laser gyroscope body having a resonant cavity. The ring laser gyroscope body has CW and CCW counterpropagating light beams propagating in a plane normal to the rate input axis of the ring laser gyroscope. The ring laser gyroscope detector lens system comprises a means for extracting a component of each of the CW and a CCW light beams from the cavity and for providing extracted CW and CCW beams. A means for combining the extracted CW and CCW beams to form an interference light source receives the extracted light. A planar array of detector element receives light from an objective lens means responsive to the interference light source. The objective lens means is typically a cylindrical lens that forms an interference light source pattern on the planar array of detector elements. A bias and amplification means is provided for conditioning each of the detectors in the array to be independently responsive to incident light intensity. The amplification means is further characterized to provide a detector output signal for each respective detector in response to the incident light intensity penetrating a predetermined threshold. The phase relationship between the detector output signals and the repetition rate of the detector output signals characterize the rotational polarity and rotational rate of the ring laser gyroscope body on the input axis.

12 Claims, 4 Drawing Sheets

RING LASER GYRO DETECTOR LENS SYSTEM

BACKGROUND OF THE INVENTION

1. Field of the Invention

This invention relates to be field of inertial guidance and more particularly to the field of ring laser gyroscopes and to the field of detector systems used by ring laser gyroscopes to detect rotational information from counterpropagating light beams.

2. Description of Prior Art

Detector systems used in ring laser gyroscope applications typically employ at least one partially transmissive mirror at locations in a resonant cavity through which components of a CW and a CCW beam are extracted. The beams are then combined using combining optics such as a prism. The combined beams are then directed onto a focal plane to form an illuminated spot in which interference patterns are characterized as areas of high and low intensity. As an ring laser gyroscope experiences an input body rate, the interference patterns move across the illuminated spot in response to the SAGNAC effect. Conventional ring laser gyroscope detector systems position an array of two or three PIN diode detectors in the illuminated spot on the focal plane, the diode detectors being positioned and biased to sense and provide electrical signals in response to movement of the interference pattern across their surface. The electrical signals thus provided are amplified and conditioned to provide digital body rate information.

A conventional ring laser gyroscope detector system will typically have an illuminated spot size of greater than 0.030 inches and will use diodes of 0.030 inches on an edge, and separated by 0.005 inches.

The diodes used are typically semiconductor or rectangular in shape. The size of the diode, the depth of the diffusion, the peak intensity of the illuminated spot and the separation of the interference patterns each combine to influence the detector system's signal to noise ratios and bandwidth.

SUMMARY OF THE INVENTION

It is a major objective of this invention to provide a ring laser gyroscope detector lens system that allows the size of a typical semiconductor detector to be reduced in total area by more than fifty percent without experiencing a commensurate reduction in signal to noise ratio.

It is a further objective of this invention to simplify the design of the detectors used to enable the use of conventionally shaped detectors.

It is another objective of this invention to provide a detector lens system having substantially higher immunity to gamma radiation which typically contributes to reduced signal-to-noise ratio.

DESCRIPTION OF THE PREFERRED EMBODIMENT

Figures 1, 2:
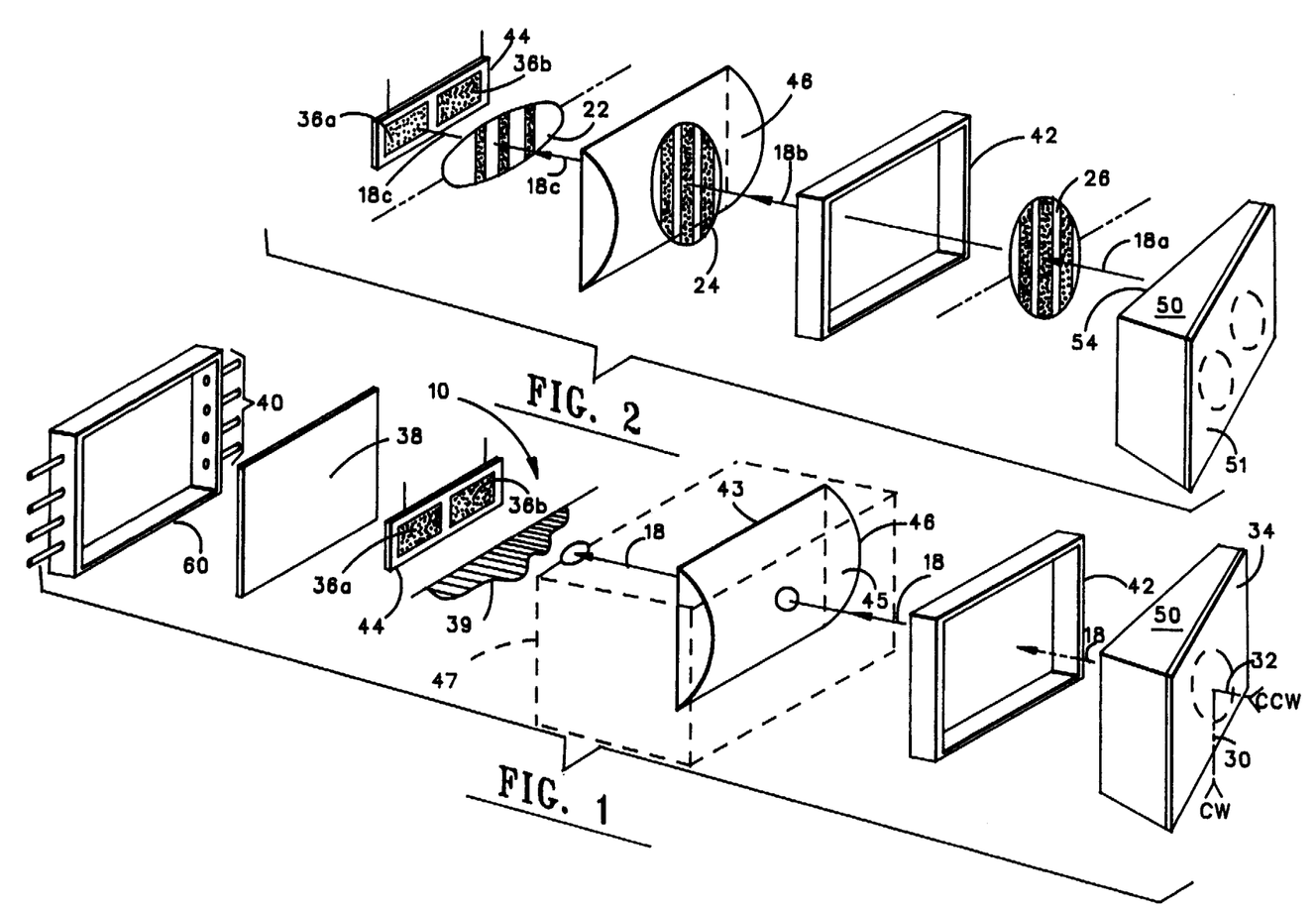
FIG. 1 is an exploded perspective view of the invention detector system showing the relative intensity of light on this detector.
FIG. 2 is an exploded perspective view of the invention detector system showing a representation of typical interference patterns on three intermediate image planes.

FIG. 1 shows the invention ring laser gyroscope detector lens system 10 for mounting on an ring laser gyroscope body (not shown). A typical ring laser gyroscope has a resonant cavity in which CW 30 and CCW 32 counterpropagating light beams propagate in a plane normal to the rate input axis of the ring laser gyroscope, The ring laser gyroscope detector lens system 10 of FIG. 1 is comprised of the following elements, Mirror 34 represents a means for extracting a component of the CW and a component of the CCW light beams from the cavity to provide extracted CW and CCW beams, Prism 50 represents a means for combining the extracted CW and CCW beams to form interference light source 12 shown in FIG. 5. A planar array of detector elements 44 is shown receiving light from cylindrical lens 46, Cylindrical lens 46 represents an objective lens means 47 responsive to the interference light source for forming an interference light source pattern shown as pattern 22 in FIG. 2 on the planar array of detector elements 44.

Figure 6:
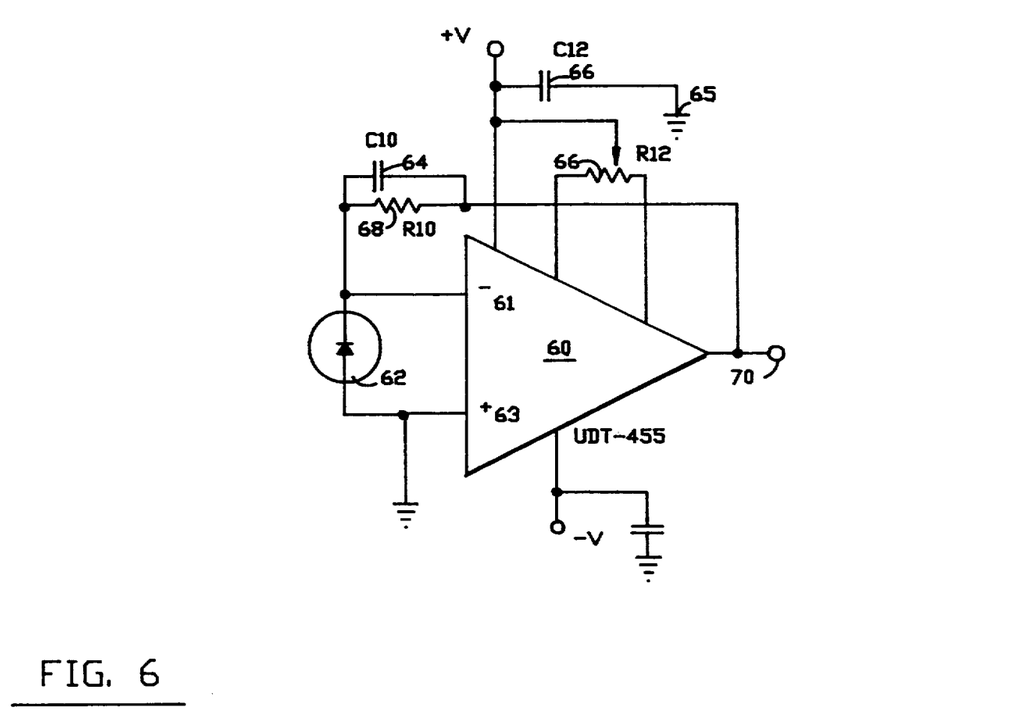
FIG. 6 is a schematic of a typical detector bias and amplifier circuit.

FIG. 6 characterizes a typical bias and amplification means such as a UDT-55 from United Detector Technology of Hawthorne, Calif. for conditioning each of the detectors in the array to be independently responsive to incident light intensity from the interference light source. The amplification means is characterized to provide a detector output signal for each detector in response to the incident light intensity penetrating a predetermined threshold. The phase relationship between the detector output signals and the repetition rate of the detector output signals characterize the rotational polarity and rotational rate of the ring laser gyroscope body on the input axis.

Figure 7:
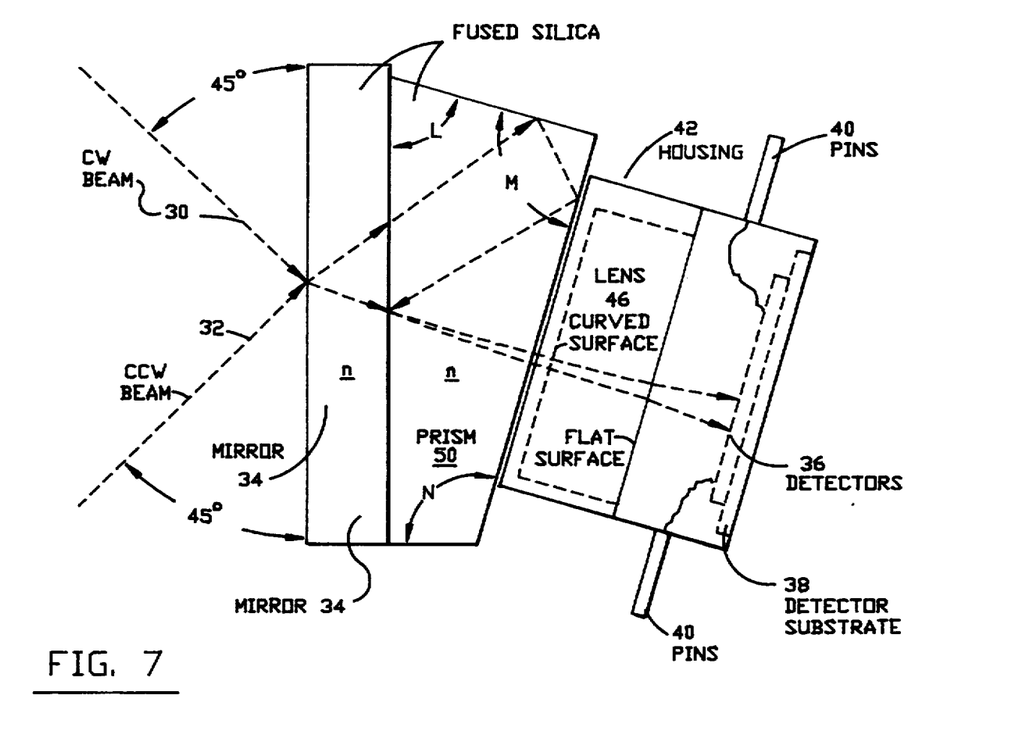
FIG. 7 is a stop plan view of the assembled ring laser gyroscope detector lens 'system showing a ray trace from the CW and CCW beams through to the detectors.

Referring to FIG. 7, mirror 34 represents a more detailed characterization of a means for extracting a component of each of the CW and CCW light beams 30, 32 from the cavity (not shown). The mirror 34 comprises at least one partially transmissive mirror at the intersection of rays 30 and 32, as shown, and is positioned to receive the CW and CCW propagating light beams 30, 32 from the resonant cavity. The mirror is characterized to permit transmission of a predetermined percentage of the intensity of each respective beam to the combining prism 50. Typical mirrors transmit less than 2 percent of received incident light.

Figure 5:
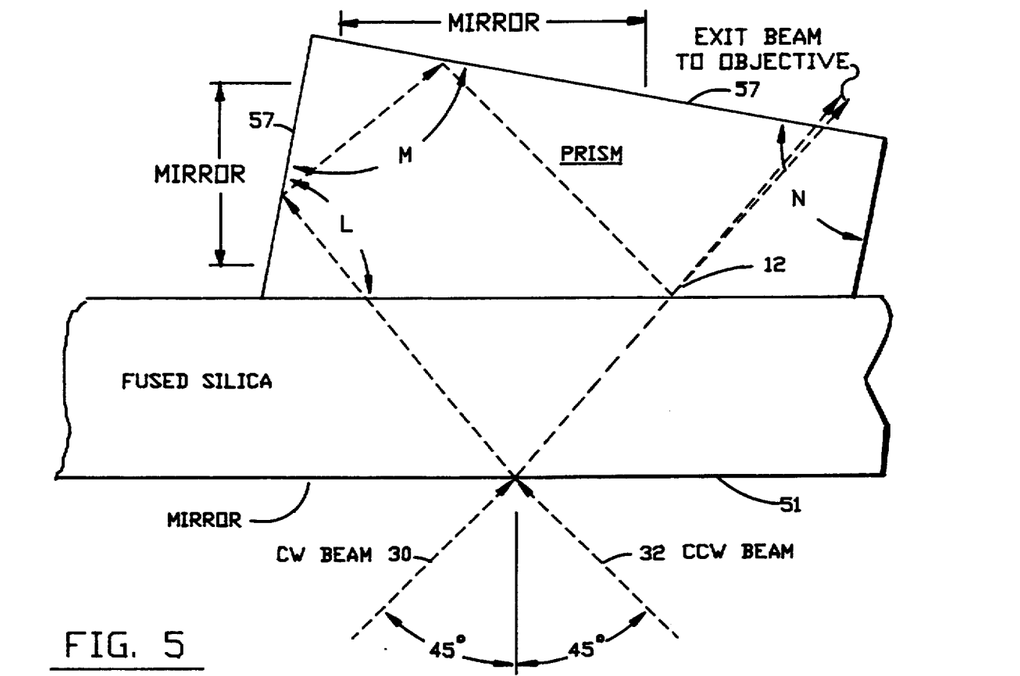
FIG. 5 is a sectional view of the prism and mirror showing a typical ray tracing of the CW and CCW beams from entrance to exit as an interference light source.

FIG. 5 provides a detail characterization of a typical prism 50 in section. Prism 50 functions as a means for combining the CW and the CCW beams 30, 32 to form an interference pattern light source at 12.

FIG. 2 shows circular images 24 and 26, and eliptical image 22, each of which are meant to represent the interference light patterns that would appear on an image plane, such as a sheet of paper, if inserted at that point. The CW and CCW beams are combined to form an interference light source characterized as ray 18a, 18b and 18c. Prism 50 has a receiving face 51 positioned to receive the extracted CW and CCW beams from the ring laser gyroscope cavity. Prism face 54 functions as a transmitting face. The prism is characterized to internally combine the extracted CW and CCW beams 30, 32 to provide the interference light source at 12, as shown in FIG. 5.

The planar array of detector elements 44 typically comprises at least two detector diodes 36a, 36b; however, the diodes 36a, 36b are positioned to be relatively normal to the interference light source characterized by ray 18c. Phantom block 47 in FIG. 1 shows the location of the objective lens means. Cylindrical lens 46 represents a particular embodiment of the objective lens means that is responsive to the interference light source 18 for forming an interference light source pattern on the planar array of detector elements 44. Reference 39 locates a depiction of a graph characterizing the relative intensity of the interference light source beam 18 on the surface of detectors 36a, 36b.

The cylindrical lens 46 shown in FIGS. 1 and 2 is positioned to receive the interference light source, characterized by ray 18, on its curved surface 45 from a means for combining the CW and CCW beams. The cylindrical lens forms the interference light source 18b into a relatively elliptical pattern 18c on the planar array of detector elements. FIG. 2 represents this eliptical pattern as ellipse 22 and also depicts a typical interference pattern.

Figure 3:
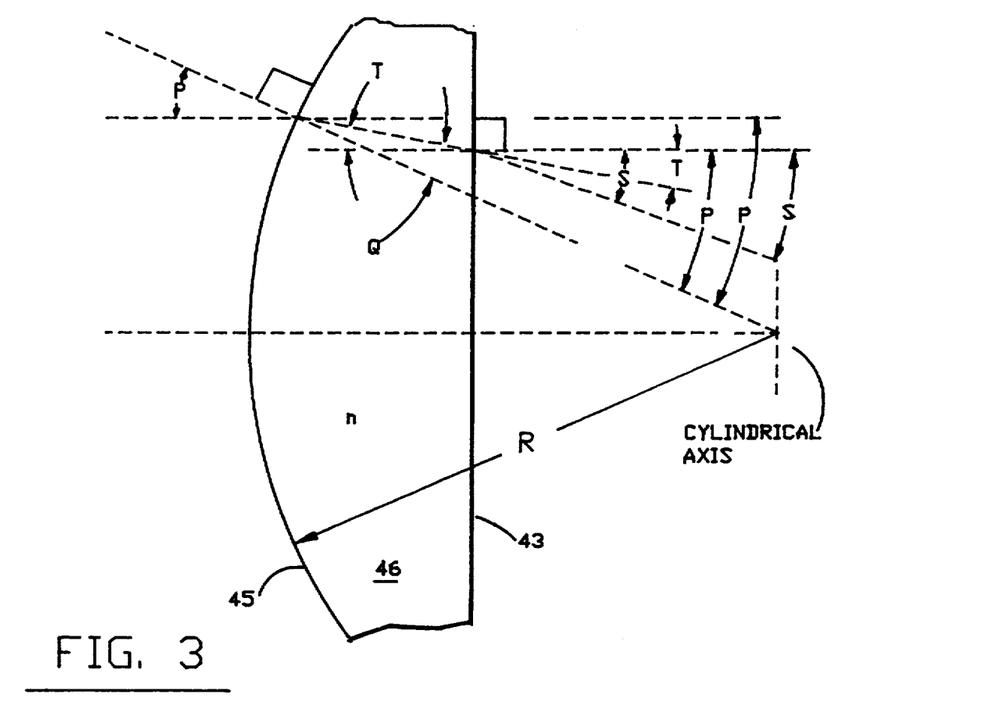
FIG. 3 is a typical ray tracing through a cylindrical lens shown in section.

The cylindrical lens has a curved surface 45. FIG. 3 shows the curved surface 45 having a radius of curvature R measured from a cylindrical axis 41. The radius R is in a plane normal to the cylindrical axis. The flat surface 43 is parallel to the cylindrical axis 41 and is normal to the systems principal axis characterized by ray 18.

The planar array of detector elements 44 are typically diffused as a planar array in a silicon wafer. Metallized contacts to the diode are formed on the wafer surface and FIG. 7 shows leads 87a and 87b connecting these metallized contacts to pins 40.

Referring now to FIG. 6, the bias and intensity amplification means for conditioning each of the detector in the array to be independently responsive to incident light typically includes a back biased pin diode 62, a bias means for biasing the pin diode, such as resistor R10 from the output pin 70, each of the pin diodes 62 being positioned to be responsive to the interference light source 18c. FIG. 6 shows a typical detector amplifier circuit such as that supplied in a single package by the United Detector Technology Company of Hawthorne, Calif.

The design process begins with a scale drawing of the lens on coordinate paper. It can be done by hand since the model structure is simple. Three typical rays are selected. The first ray is at the periphery, the second at the opposite periphery, and the last on the principal axis of the beam. Using the index of refraction of the lens, the angle of the beam between the rays are calculated as they enter the lens, pass through the lens and exit the lens. The rays are drawn as they pass through the system to their point of convergence. This point locates the focal plane of the detectors.

Knowing the width of the lens, you measure the distance to the focal plane and that determines the distance from the center of the lens to the detector—the ideal distance.

The-Amplifier and Detectors

The detectors are PIN diodes that are back biased to approximately 6 Vdc. The amplifier is a transconductance amplifier. The detectors are low noise and custom manufactured. We would specify the geometry and the thickness to control the sensitivity to radiation damage.

Using a cylindrical lens allows the height of the detector to be reduced to typically ⅓ of its previous height.

Reducing the depth of the detector is not essential to this invention. Gallium Arsenide is more efficient than silicon at 6328 Angstroms, which is the wavelength of greatest interest in ring laser gyroscope applications. An Angstrom is $10^{-10}$ meters.

The Lens and Prism

Cylindrical lenses typically have a radius of curvature from 0.5 to 3.0 inches. The index of refraction of optical glass is typically 1.3 to 1.7. In this embodiment, the lens is made of fused silica which has an index of refraction of 1.457. Fused silica is produced synthetically by the vapor phase hydrolysis of silicon halide. Synthetic fused silica is a vitreous non-crystalline highly transparent glass. Fused silica was selected for its resistance to degradation when exposed to high levels of radiation. Fused silica is a radiation resistant glass and it is necessary if radiation hardness is the object of the invention.

The prism is also fused silica. Fused silica is a synthetic commercial material from Dynasil ® Corporation of America of Cooper Road, Berlin, N.J. Silica is like silicon dioxide but it takes on a different structure when it is fused Silica due to the way it is melted and formed.

Zerodur ® would be preferable dimensionally but darkens too much for a given amount of radiation. An engineering tradeoff is involved.

The subject invention can be designed to position all light from the objective onto the detectors, thus increasing the signal to noise ratio. This feature of the invention simplifies the design of the diode array.

Lens Design Procedure

Figure 4:
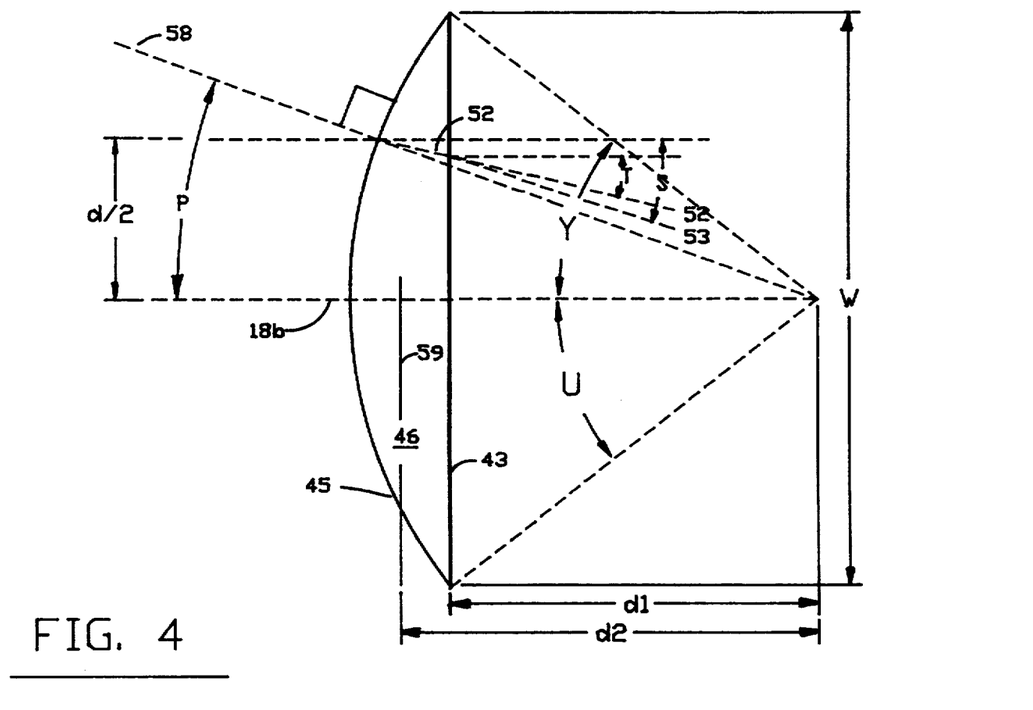
FIG. 4 is a sectional view of the lens showing its relationship to the rays traced in FIG. 3 and to a focal point.

The lens design procedure consists of two steps: referring to FIG. 4, first, select the lens width W and use this to determine the focal length d2; second, perform a ray trace to find angle S and use beam radius d//2 with angle S to determine the approximate distance d1 from the flat surface of the lens to the focal plane, where the detector will (ideally) be located. For the purpose of clarity, the symbol "*" will be used to denote multiplication and the symbol "/" to denote division.

Focal Length Computation

Referring to FIG. 4, the focal length computation procedure begins by acknowledging that the focal length of a cylindrical lens is approximately:

1. $f = d2 = R/(n-1)$

Equation 1 is obtained from conventional optics design principles such as those relating thin lens design based on spherical surfaces such as the "lensmaker's" equation 5.16 on page 107 of a text "OPTICS" by Eugene Hecht et al in 1974 by the *Addison Wesley Publishing Company* of Menlo Park, Calif. as:

2. $1/f = (n-1)(1/R1 - 1/R2)$

R1 is the radius of the first surface and R2 is the radius of the second surface of a typical thin lens, not shown in the accompanying figures. Since the second surface 43 in FIG. 3 is flat, R2= ∞ and the 1/R2 term goes to zero. R1 becomes the radius R of the front surface 45 of the lens. Solving equation 2 for $f = d2 = R/(n-1)$.

Referring to FIG. 4, the lens width "W" is chosen to be 2*d, where d/2 is one half of the diameter of the beam 18b incident on the lens. W represents the chord of a cylinder of radius R, with the curved periphery of the circle representing the curved surface 45 of the lens and the chord of length W representing the flat surface 43 of the lens. Choosing W=2*d allows for tolerance in the positioning of the lens with respect to the beam during assembly.

Referring to FIG. 4, the half-angle of curvature U of the lens' curved surface is limited to be not greater than approximately 40 degrees in order for the "lensmaker's" equation to apply. Angle U should be as large as possible, subject to this limitation, so that the focal length is small, hence allowing the detection to be positioned close to the lens' flat surface for compactness of the invention. Selecting U to be 40 degrees, the relation:

3. $W/2 = R*SIN(U) = R*SIN(40°)$ is obtained using only simple trigonometry. Substituting W=2*d and evaluating the SIN(40°) term, equation:

4. $d = 0.64*R$ is obtained. Rearranging for R provides equation:

5. $R = d/0.64$ and this is substituted into equation 1 along with the index of refraction for fused silica, n=1.457, to obtain:

6. $f:d2 = R/(n-1) = d/0.64*(1.457-1) = 3.42*d$

This relationship is approximated by selecting:

7. $f = d2 = 3.5*d$ which relates the focal length of the lens to the diameter of the beam.

Ray Trace

Referring to FIG. 3, a ray 54 of the periphery of the incident beam is selected and traced through the lens. Due to the symmetry of both the beam and the lens, a ray at the opposite periphery of the beam will trace angles of the same magnitude but will deflect in the opposite direction as it passes through the lens. A third ray 18b, drawn along the principal axis of the beam and lens, will not be deflected since it traverses normal to the surface at each air-glass interface. Thus, only a single ray need be traced.

Referring now to FIG. 3, Snell's Law is applied to relate angle P to angle Q as:

8. $SIN\ P = n*SIN\ Q$ where n is the index of refraction of the fused silica lens 46. Recall that as a ray moves from a material having a lower index of refraction, such as air at 1, into a material having a higher index of refraction, the ray 54 is deflected toward the normal 58 to become ray 52 inside the lens. This process is reversed as the ray 53 leaves the lens moving from a higher index of refraction (1.457) to a lower one for air of 1.0. From FIG. 3, it is apparent that:

9. $d/2 = R*SIN\ P$ where d/2 is the radius of the beam 18C in FIG. 1 measured to the 2σ level of intensity. From equation 2 we obtain equation 10:

10. $R = f*(n-1)$

Substituting the right side of equation 10 for the variable R in equation 8 provides equation 11 below:

11. $d/2 = f*(n-1)SIN\ P$

By subtracting the value in equation 7 for f in equation 11, equations

12. $d/2 = (n-1)*3.5*d*SIN\ P$ and

13. $d = 7*(n-1)*d*SIN\ P$ are obtained.

From equation 13, an equation for P is obtained

14. $P = SIN^{-1}d/(7*n-1)*d$ or, cancelling d in the right side of equation 14, 15. $P = SIN^{-1}1/(7*n-1)$.

Substituting for n in equation 15, n=1.457, then

16. $P = SIN^{-1}0.313 = 18.2°$

From equation 8, the angle Q is:

17. $Q = SIN^{-1}(SIN\ P/n) = SIN^{-1}(0.313/1.457)$

18. $Q = 12.4°$.

Referring to FIG. 3, as ray 52 approaches the rear lens surface 43, it forms angle T with normal ray 39. Ray 37 leaves as ray 40 and forms angle S with normal 59. In accordance with Snell's Law, angles T and S are related by equation 19:

19. $n*SIN\ T = SIN\ S$.

From the geometric relationships of FIG. 3, equation 20 is apparent:

20. $T = P - Q$.

Substituting the right side of 20 for angle T in equation 19 provides:

21. $n*SIN(P-Q) = SIN\ S$

22. $S = SIN^{-1}(n*SIN(P-Q))$

23. $S = SIN^{-1}(1.457*SIN(18.2° - 12.4°))$

24. $S = SIN^{-1}(1.457*SIN(5.8°))$.

Therefore,

25. $S = 8.5°$.

The flat part of the lens is positioned toward the Focal Plane.

Referring to FIGS. 3 and 4, neglecting the distance between 54 and 59, it can be shown that:

26. $d1 = (d/2)/(\tan S)$.

The foregoing procedure has demonstrated the design steps for the invention detector lens system. Parameters calculated included: f, the focal length; R, the lens' radius of curvature; and d1, the distance from the flat surface of the lens to the ideal detector position.

Prism-Design

Referring to FIGS. 5 and 7, the prism angle M is calculated based on the known index of refraction of fused silica, n=1.457, of which the prism is made. A design procedure is illustrated in standard reference works on Ring laser Gyroscopes such as the article by Mr. F. Aronowitz, "The Laser Gyro", in "LASER APPLICATIONS", Ed. M. Ross, published by *Academic Press*, New York, New York, 1971, on pages 139 and 140.

In FIG. 5, face 57 is shown having a partial mirror coating that covers the surface region near angle M. These coatings allow the CCW beam 32 to reflect from faces 57 and 54, combining with CW beam 30 at 12 to form the interference light source.

Although the invention method has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A ring laser gyroscope detector lens system for mounting on a ring laser gyroscope body having a resonant cavity, said ring laser gyroscope body having CW and CCW counterpropagating light beams propagating in a plane normal to the rate input axis of said ring laser gyroscope, said ring laser gyroscope detector lens system comprising:

a means for extracting a component of each of said CW and CCW light beams from said cavity and for providing extracted CW and CCW beams;

a means for combining said extracted CW and CCW beams to form a substantially circular interference light source having a diameter (d);

a planar array of detector elements;

a cylindrical lens for forming a substantially elliptical interference light source pattern on said planar array of detector elements, said cylindrical lens having:

a single curved surface, a cylindrical axis parallel to said curved surface, all points on said curved surface of said cylindrical lens being located at a predetermined radius (R) from said cylindrical axis, and a flat surface parallel to said cylindrical axis and normal to said optical axis, light from said light source passing through said lens and exiting said flat surface to form said elliptical interference light source pattern on said planar array of detector elements;

said curved surface subtending a half angle of curvature equal to or less than 40 degrees;

said substantially circular interference light source being incident on said curved surface at the primary vertex and coaxial with said optical axis;

said radius of curvature "R" being set equal to the diameter of said substantially circular interference light source "d" divided by 0.64;

said flat surface having a width "W", said width "W" being substantially equal to two times the diameter of said substantially circular interference light source;

said planar array detector elements having a geometric center, said planar array detector elements being positioned to locate said geometric center on and normal to said optical axis;

said cylindrical lens being made of fused silica and having a primary principal point located on said optical axis substantially equidistant between said cylindrical lens primary vertex and said flat surface;

said planar array detector elements geometric center being positioned on said optical axis subsequent to said cylindrical lens flat surface at a distance from said primary principal point substantially equal to 3.5 times the diameter of said substantially circular interference light source;

bias and amplification means for conditioning each said detector in said array to be independently responsive to incident light intensity, said amplification means being further characterized to provide:

a detector output signal for each detector in response to said incident light intensity penetrating a predetermined threshold;

whereby, the phase relationship between said detector output signals and the repetition rate of said detector output signals characterize the rotational polarity and rotational rate of said ring laser gyroscope body on said input axis.

2. The ring laser gyroscope detector lens system of claim 1 wherein said means for extracting a component of each of said CW and CCW light beams from said cavity further comprise:

at least one partially transmissive mirror, said mirror being positioned to receive said CW and CCW propagating light beams from said resonant cavity, said mirror being characterized to permit transmission of a predetermined percentage of the intensity of each respective beam to said means.

3. The ring laser gyroscope detector lens system of claim 1 wherein said means for combining said CW and said CCW beam to form a light source, said CW and CCW beams being combined to form an interference light source further comprises:

a prism having a receiving face positioned to receive said extracted CW and CCW beams, and a transmitting face, said prism being characterized to internally combine said extracted CW and CCW beams to provide said substantially circular interference light source.

4. The ring laser gyroscope detector lens system of claim 2 wherein said means for combining said CW and said CCW beam to form a light source, said CW and CCW beams being combined to form an interference light source further comprises:

a prism having a receiving face positioned to receive said extracted CW and CCW beams, and a transmitting face, said prism being characterized to internally combine said extracted CW and CCW beams to provide said substantially circular interference light source.

5. The ring laser gyroscope detector lens system of claim 4 wherein said partially transmissive mirror and said prism are formed from material having identical indices of refraction.

6. The ring laser gyroscope detector lens system of claim 1 wherein said planar array of detector elements further comprises:
at least two detector diodes, said diodes being positioned to be substantially normal to said substantially elliptical interference light source.

7. The ring laser gyroscope detector lens system of claim 1 wherein said objective lens means responsive to said substantially circular interference light source for forming a substantially elliptical interference light source pattern on said planar array of detector elements further comprises:
a cylindrical lens,
said cylindrical lens being positioned to receive said substantially circular interference light source on its curved surface from said means for combining said CW and CCW beams,
said cylindrical lens forming said substantially circular interference light source into a substantially elliptical pattern on said planar array of detector elements.

8. The ring laser gyroscope detector lens system of claim 5 wherein said objective lens means responsive to said substantially circular interference light source for forming a substantially elliptical interference light source pattern on said planar array of detector elements further comprises:
a cylindrical lens,
said cylindrical lens being positioned to receive said substantially circular interference light source on its curved surface from said means for combining said CW and CCW beams,
said cylindrical lens forming said substantially circular interference light source into a substantially elliptical pattern on said planar array of detector elements.

9. The ring laser gyroscope detector lens system of claim 7 wherein said cylindrical lens responsive to said substantially circular interference light source for forming a substantially elliptical interference light source pattern on said planar array of detector elements further comprises:
a curved surface,
said curved surface having a radius of curvature measured from a cylindrical axis and in a plane normal to said cylindrical axis,
a flat surface, and
a principal axis normal to said flat surface.

10. The ring laser gyroscope detector lens system of claim 8 wherein said cylindrical lens responsive to said substantially circular interference light source for forming a substantially elliptical interference light source pattern on said planar array of detector elements further comprises:
a curved surface,
said curved surface having a radius of curvature measured from a cylindrical axis and in a plane normal to said cylindrical axis,
a flat surface, and
a principal axis normal to said flat surface.

11. The ring laser gyroscope detector lens system of claim 1 wherein said prism is further characterized to have at least one mirrored surface for enhancing the internal reflectivity of said prism, said mirrored surface being positioned to avoid interference with said exiting interference light source.

12. A ring laser gyroscope detector lens system for mounting on a ring laser gyroscope body having a resonant cavity, said ring laser gyroscope body having CW and CCW counterpropagating light beams propagating in a plane normal to the rate input axis of said ring laser gyroscope, said ring laser gyroscope detector lens system comprising:
a means for extracting a component of each of said CW and CCW light beams from said cavity and for providing extracted CW and CCW beams;
a means for combining said extracted CW and CCW beams to form a substantially circular interference light source having a diameter;
a planar array of detector elements;
a cylindrical lens for forming a substantially elliptical interference light source pattern on said planar array of detector elements, said cylindrical lens having:
a single curved surface,
a cylindrical axis parallel to said curved surface, all points on said curved surface of said cylindrical Tens being located at a radius (R) from said cylindrical axis, and
a flat surface parallel to said cylindrical axis and normal to said optical axis;
said curved surface subtending a half angle of curvature equal to or less than 40 degrees;
said substantially circular interference light source being incident on said curved surface at the primary vertex and coaxial with said optical axis; light from said light source passing through said lens and exiting said flat surface to form said elliptical interference light source pattern on said planar array of detector elements;
said cylindrical lens having a radius of curvature (R), said radius of curvature being set equal to the diameter of said substantially circular interference light source divided by substantially 0.64;
said flat surface having a width "W", said width being substantially equal to two times the diameter of said substantially circular interference light source;
said planar array detector elements having a geometric center, said planar array detector elements being positioned to locate said geometric center on said optical axis, said planar array being normal to said optical axis;
said cylindrical lens being made of fused silica and having a primary principal point located on said optical axis at a point substantially equidistant between the lens primary vertex and said flat surface;
said planar array detector elements geometric center being positioned on said optical axis subsequent to said cylindrical lens flat surface at a distance from said primary principal point substantially equal to 3.5 times the diameter of said substantially circular interference light source;
bias and amplification means for conditioning each said detector in said array to be independently responsive to incident light intensity, said amplification means being further characterized to provide:

a detector output signal for each detector in response to said incident light intensity penetrating a predetermined threshold;

whereby, the phase relationship between said detector output signals and the repetition rate of said detector output signals characterize the rotational polarity and rotational rate of said ring laser gyroscope body on said input axis.

* * * * *